(12) United States Patent
Zantl

(10) Patent No.: US 7,934,519 B2
(45) Date of Patent: May 3, 2011

(54) VALVE UNIT FOR A MICROFLUID SYSTEM

(75) Inventor: Roman Zantl, Baldham (DE)

(73) Assignee: ibidi GmbH, Martinsried (DE)

( * ) Notice: Subject to any disclaimer, the term of this patent is extended or adjusted under 35 U.S.C. 154(b) by 659 days.

(21) Appl. No.: 11/943,723

(22) Filed: Nov. 21, 2007

(65) Prior Publication Data
US 2008/0223463 A1 Sep. 18, 2008

(30) Foreign Application Priority Data

Dec. 8, 2006 (EP) .................................. 06025472
Jun. 1, 2007 (EP) .................................. 07010920

(51) Int. Cl.
*F16K 11/22* (2006.01)
(52) U.S. Cl. ............... 137/563; 137/565.37; 137/601.01
(58) Field of Classification Search .................. 137/256, 137/563, 571, 597, 565.17, 565.37, 601.01
See application file for complete search history.

(56) References Cited

U.S. PATENT DOCUMENTS

| | | | | |
|---|---|---|---|---|
| 3,975,946 A | * | 8/1976 | Ball et al. | 73/61.56 |
| 4,957,009 A | * | 9/1990 | Nohl et al. | 73/864.84 |
| 5,099,884 A | * | 3/1992 | Monahan | 137/827 |
| 5,551,309 A | * | 9/1996 | Goossens et al. | 73/863 |
| 6,415,821 B2 | * | 7/2002 | Kamholz et al. | 137/827 |
| 6,467,264 B1 | * | 10/2002 | Stephenson et al. | 60/460 |
| 2006/0185734 A1 | * | 8/2006 | Hagen et al. | 137/255 |

* cited by examiner

*Primary Examiner* — Stephen M Hepperle
*Assistant Examiner* — Kevin Murphy
(74) *Attorney, Agent, or Firm* — IP Strategies

(57) ABSTRACT

The present invention relates to a valve unit for a microfluid system comprising a first and a second fluid reservoir, a flow chamber, a fluid channel array and a conveying means, said first fluid reservoir being, via the flow chamber, in fluidic communication with the second fluid reservoir through the fluid channel array,
wherein the valve unit can be brought from a first state to a second state so that, in said first state, a fluid can be conveyed by the conveying means from said first fluid reservoir through the flow chamber in a predetermined direction of flow into the second fluid reservoir, and so that, in said second state, a fluid can be conveyed by the conveying means from said second fluid reservoir through the flow chamber in a predetermined direction of flow into the first fluid reservoir.

20 Claims, 2 Drawing Sheets

VALVE UNIT FOR A MICROFLUID SYSTEM

FIELD OF THE INVENTION

The present invention relates to a valve unit for a microfluid system and to a means for conveying a fluid in a microfluid system.

BACKGROUND OF THE INVENTION

For a plurality of applications, fluids, in particular liquids, are conducted through a microfluid system for a prolonged period of time. Possible applications in this respect are e.g. biofilm examinations or the monitoring of cells under continuous flow conditions. Such examinations are used e.g. in the field of atherosclerosis research or in connection with adhesion phenomena (e.g. rolling).

In the case of conventional systems with an open circuit, a liquid to be transported or conveyed is provided in a separate reservoir, e.g. a beaker. With the aid of a pump, e.g. a diaphragm pump or a peristaltic pump, this liquid is conducted from the reservoir through a flow chamber, e.g. in the form of a channel.

The amount of liquid available for flow-though in such systems is limited especially by the dimensions of the reservoir. Typical liquid volumes lie between 1 ml and 500 ml.

The amount of liquid used depends, inter alia, on the respective costs, e.g. the price of the dissolved agents, and the requirements that have to be met with regard to a physiologically relevant geometry and dimensioning of the flow chamber. The ratio of flow chamber width to flow chamber height that is typically chosen is a ratio between 5:1 and 100:1. The flow rates are determined by the channel dimensions and also by experimental questioning. Microfluid channels have, typically, a volume of 0.1 µl to 1000 µl; typical flow rates range from 0.5 ml/min to 500 ml/min.

In the case of the above-mentioned fluid volumes in the reservoir, the whole reservoir volume is consequently conducted through the microfluid system within a period of 2 minutes to approx. 16 hours. The liquid conducted through the microfluid system is then also received by and accommodated in a separate reservoir. When this liquid is conveyed through the microfluid system once more, this will be done in the opposite the direction of flow.

Alternatively to open circuits also closed circuits can be used, in the case of which a single separate liquid reservoir is provided, from which the liquid is taken and into which the liquid is returned after having flown through the flow chamber.

In the case of closed circuits, peristaltic pumps are normally used. However, this pump mechanism leads to an intensive mechanical load e.g. on cells suspended in the liquid. Hence, effects to be examined will be influenced in an undesirable way; this may e.g. lead to an unspecific activation of immune cells whose adhesion characteristics should, however, be examined on the basis of specific activation.

BRIEF SUMMARY OF THE INVENTION

Against the background of the normally used systems, it is therefore an object of the present invention to provide a valve unit for a microfluid system as well as a microfluid system by means of which a flow through the microfluid system is made possible in a simple manner and for a prolonged period of time.

This problem is solved by a valve unit according to claim 1 and a microfluid system according to claim 9.

According to the present invention, a valve unit for a microfluid system is provided, said microfluid system comprising a first and a second fluid reservoir, a flow chamber, a fluid channel array and a conveying means, said first fluid reservoir being, via the flow chamber, in fluidic communication with the second fluid reservoir through the fluid channel array, wherein the valve unit can be brought from a first state to a second state so that, in said first state, a fluid can be conveyed by the conveying means from said first fluid reservoir through the flow chamber in a predetermined direction of flow into the second fluid reservoir, and so that, in said second state, a fluid can be conveyed by the conveying means from said second fluid reservoir through the flow chamber in a predetermined direction of flow into the first fluid reservoir.

It follows that such a valve unit provides the advantageous possibility of conveying a fluid continuously, i.e. without any interruption, through the microfluid system. The fluid flows through the flow chamber in a predetermined direction of flow irrespectively of whether the fluid is conveyed from the first into the second fluid reservoir or from the second into the first fluid reservoir.

A fluid reservoir comprises a cavity for accommodating a fluid. The fluid reservoir may, but need not, be open towards the surroundings. A flow chamber comprises a cavity through which a fluid can flow. The flow chamber may comprise a channel. The flow chamber may, but need not, be open towards the surroundings. In particular, the flow chamber may be a channel which is sealed from the surroundings. A fluid channel and/or a flow chamber can have a ratio of width to height between 5:1 and 100:1. A fluid channel and/or a flow chamber can have a volume of 0.1 µl to 1000 µl.

The valve unit can be brought from the first state to the second state in particular automatically and/or in a self-controlled manner.

The fluid can be a gas or a liquid.

The valve unit can comprise four stop valves, which are arranged after the fashion of a bridge rectifier.

Especially, a stop valve can allow passage of a fluid stream in only one direction of flow. By means of a bridge rectifier assembly, it is accomplished in an advantageous manner that the fluid will flow through the flow chamber always in the same direction of flow, no matter whether it is conveyed from the first fluid reservoir or from the second fluid reservoir.

In particular, the valve unit can comprise four stop valves and four terminals for establishing a fluidic connection between the valve unit and the first fluid reservoir, the second fluid reservoir, a first mouth of the flow chamber, in particular an inlet opening in the direction of flow, and a second mouth of the flow chamber, in particular a discharge opening in the direction of flow. The valve unit can be implemented such that a fluidic connection can be established between each fluid reservoir and the first and the second mouth, one of the stop valves being arranged along each of these connections. In particular, the valve unit can be implemented such that a fluidic connection can be established between each fluid reservoir and the first mouth as well as the second mouth so that along each of these connections one of the stop valves is arranged such that the flow-through direction of each stop valve is directed towards the inlet opening.

In this way, a bridge rectifier assembly is obtained by means of which the fluid is continuously conveyed alternately from the first and from the second fluid reservoir in the same direction of flow through the flow chamber.

At least one of the two terminals for connecting the valve unit with a mouth of the flow chamber can be branched so that the respective mouth can be connected via the terminal in question to two stop valves. In particular, each of the two terminals used for connecting the valve unit to one of the mouths can be branched so that each mouth can be connected via a respective terminal to two stop valves. The branch can be implemented e.g. in the form of a Y-piece or a T-piece.

At least one of the stop valves of the above-described valve units can be an externally controlled stop valve. Externally controlled means that the valve is adapted to be controlled from outside. The valve can thus e.g. be opened or closed actively, independently of the direction of flow, pressure and flow rate, etc.

At least one of the stop valves of the above-described valve units can be a non-return valve. The non-return valve can be unloaded or spring-loaded. The non-return valve may e.g. be an unloaded non-return ball valve. The non-return valve can be externally controlled or self-controlled. In the case of a self-controlled non-return valve, said valve can be adapted to be unblocked. In particular, each of the four stop valves can be implemented as a non-return valve. At least one of the stop valves can be a pinch valve. In particular, each of the four stop valves can be implemented as a pinch valve.

The above-described valve units can be formed in a substrate. In this case, e.g. the stop valves and the fluid channels interconnecting said stop valves can be provided in the substrate. The interconnecting fluid channels can be arranged such that a bridge rectifier array of the stop valves is obtained. Furthermore, the substrate can comprise four terminals for establishing a fluidic connection with the first fluid reservoir, the second fluid reservoir, an inlet opening of the flow chamber in the direction of flow, and a discharge opening of the flow chamber in the direction of flow.

The substrate can especially be planar. It can comprise a base plate and a cover plate, said cover plate having recesses provided therein and being connected to the base plate so that fluid channels and/or at least a part of a stop valve, in particular the seat of a stop valve, are formed by said recesses. The cover plate may be connected area-wide to the base plate. The substrate may comprise a further cover plate, especially when recesses are provided on both sides of the first cover plate, said recesses being then covered by the base plate and the additional cover plate. In this case, the first cover plate is connected to the base plate on one side and to the additional cover plate on the other side thereof. The cover plate may be connected area-wide to the base plate and to the additional cover plate, respectively. The base plate and/or the cover plate can comprise a plastic material. In particular, the cover plate can be implemented as an injection moulded part and the base plate can be implemented as a film. If a second cover plate is used, also said second cover plate can be implemented as a film.

According to one alternative, the valve unit can be a directional valve, in particular a 4/2 way valve. Also these directional valves allow to accomplish, in an advantageous manner, a continuous conveyance of fluid through the flow chamber from the first as well as from the second fluid reservoir. A bridge rectifier array is not necessary in this case. The directional valve can in particular have a first switching position, in which the valve unit is in its first state, and a seconding switching position, in which the valve unit is in its second state.

The above-described valve units can comprise four stop valves and four terminals for establishing a fluidic connection with the first fluid reservoir, the second fluid reservoir, a pressurizing means and the surroundings, the valve unit being implemented such that each fluid reservoir can be connected to the pressurizing means via a respective stop valve and to the surroundings via another stop valve. By a constant application of pressure and by suitable switching (opening and closing) of the stop valves, such a valve unit allows a fluid to be conveyed from one fluid reservoir into another fluid reservoir (possibly via an additional valve unit of the type described hereinbefore and a flow chamber). The drawback that, in cases where an overpressure and a negative pressure are alternately applied to the fluid reservoirs, the overpressure target value will not be reached at the same time as the negative pressure target value will be avoided in this way. The term surroundings means here in particular the ambient pressure; hence, the respective fluid reservoir can be opened to the outside through the respective fluid connection.

In this respect, the valve unit can, in particular, comprise six terminals for establishing a fluidic connection, each fluid reservoir being adapted to be connected to the valve unit via two terminals in such a way that each fluid reservoir can be connected to the pressurizing means via one stop valve and to the surroundings via another stop valve.

The present invention additionally provides a microfluid system comprising:
  a first and a second fluid reservoir,
  a flow chamber,
  a fluid channel array which is arranged such that the first fluid reservoir is in fluidic communication with the second fluid reservoir via the flow chamber,
  a conveying means for conveying a fluid from said first fluid reservoir via the flow chamber into said second fluid reservoir; and
  one of the above-described valve units.

In such a microfluid system a continuous conveyance of a fluid with a constant direction of flow through a flow chamber can be achieved.

The conveying means can comprise a first pressurizing means, in particular an air pressure pump, a piston pump, a diaphragm pump, a peristaltic pump, a syringe or a syringe pump, so as pressurize the interior of the first fluid reservoir. Depending on the type of use and on the ambient conditions, a suitable pressurizing means can be selected. It is e.g. possible to select a syringe pump, when the valve units include self-controlled non-return valves, since a sufficient differential pressure for closing the non-return valves can be built up by this kind of pump. In the case of an air pressure pump, the valves used can especially be externally controlled valves.

The term pressure means here overpressure as well as negative pressure. In the case of a negative pressure, the fluid would consequently be sucked in.

In the case of the above-described microfluid systems, the fluid can be a liquid and the conveying means can comprise a hydrophobic ferrofluid which is arranged in the first fluid reservoir in such a way that the liquid can be pressurized via the ferrofluid by means of a magnetic field.

A ferrofluid comprises a carrier liquid containing magnetic particles in the form of a colloidal suspension. The carrier liquid can comprise e.g. perfluorocarbon. By means of a magnetic field, a force can be applied to such a ferrofluid so that, in the case of an appropriately directed force, said ferrofluid will, in turn, apply pressure to the liquid. The magnetic field can be generated e.g. by means of moving magnets, e.g. rotating magnets, or by means of induction. This allows a liquid to be conveyed in a simple manner, especially when the volumes of liquid are small. In addition, the contamination risk can be reduced, since a direct contact between the interior of the reservoir and the surroundings is not necessary.

The conveying means of the above-described microfluid systems can be provided with a piston which is arranged such that the interior of the first fluid reservoir can be pressurized. The piston can be arranged e.g. on or in said first fluid reservoir.

In the case of the above-described microfluid systems, the conveying means can be provided with a piston which is arranged such that the interior of the second fluid reservoir can be pressurized. The conveying means can be provided with a piston which is arranged such that it is adapted to be moved by a fluid conveyed into the second fluid reservoir. Especially the last-mentioned mode of arrangement allows the second fluid reservoir to be sealed from the surroundings, without necessitating, however, the use of a bleeding device.

In the case of the above-described microfluid systems at least a part of said first and/or second fluid reservoir(s) can be formed by a syringe cylinder. It follows that a syringe can provide a fluid reservoir, viz. the syringe cylinder or the syringe housing, and at least a part of the pressurizing means, viz. the syringe piston.

The fluid of the above-described microfluid systems can be a liquid and the conveying means of the microfluid systems can be implemented such that a fluidic connection is established between the fluid and at least one pressurizing means, a gas being provided in at least part of said fluidic connection. The gas can especially be air.

It follows that a gas column is provided between the pressurizing means and the fluid.

In this case, it is e.g. possible to first apply pressure to the gas through which pressure will then be applied to the liquid in the fluid reservoir so that a conveyance of liquid will be accomplished. It follows that e.g. the fluid reservoirs and the flow chamber with the interconnecting fluid channel array can be kept under defined ambient conditions, e.g. in an incubator. The conveying means can be kept separately, conveyance of the fluid being effected by applying pressure to a gas column provided between the conveying means and the first fluid reservoir. This will especially avoid an influence, e.g. due to a rise in temperature, of the conveying means on the defined ambient conditions for the fluid reservoirs and the flow chamber.

In particular, one or both of the above-described pressurizing means can be connected via an at least partially gas-filled fluid channel, e.g. a hose, to a respective fluid reservoir in such a way that the interior of the fluid reservoir can be pressurized.

The conveying means of the above-described microfluid systems can comprise a second pressurizing means, in particular a pressure pump, a piston pump, a diaphragm pump, a peristaltic pump, a syringe or a syringe pump, so as pressurize the interior of the second fluid reservoir.

In particular, the conveying means an be implemented such that the interior of the second fluid reservoir is adapted to have applied thereto a negative pressure, whereas the first pressurizing means applies an overpressure to the interior of the first fluid reservoir.

The above-described microfluid systems can additionally comprise a sensor unit for determining a flow of fluid, a fluid level and/or a fluid pressure in the microfluid system, in particular in one of the two fluid reservoirs. This allows an examination and a monitoring of the flow of fluid and, consequently, of the operability of the system.

In addition, the microfluid systems can comprise a control means for controlling the valve unit, the conveying means and/or the sensor unit. This control means can especially be implemented such that an automatic control in accordance with predetermined parameters can be executed. In particular, the control means can be implemented such that the fluid can flow continuously through the flow chamber.

The valve unit of the microfluid system can comprise four externally controlled stop valves and the control means used for controlling the valve unit can be implemented such that two respective stop valves are closed and two respective stop valves are opened simultaneously.

The present invention additionally provides a microfluid system, comprising
  a first and a second fluid reservoir,
  a flow chamber,
  a fluid channel array which is arranged such that the first fluid reservoir is in fluidic communication with the second fluid reservoir via the flow chamber,
  a conveying means for conveying a fluid from said first fluid reservoir via the flow chamber into said second fluid reservoir,
  a first valve unit comprising four stop valves and four terminals through which a fluidic connection can be established between said first valve unit and the first fluid reservoir, the second fluid reservoir, a first mouth of the flow chamber and a second mouth of the flow chamber,
  a second valve unit comprising four stop valves and four terminals through which a fluidic connection can be established between said second valve unit and the first fluid reservoir, the second fluid reservoir, a pressurizing means and the surroundings, said valve unit being implemented such that each fluid reservoir is adapted to be connected to the pressurizing means via one stop valve and to the surroundings via another stop valve.

The first and/or second valve unit(s) can in particular be one of the above-described valve units. In particular, the conveying means can comprise the second valve unit.

The terminal for connection to the pressurizing means can include a branch, e.g. in the form of a Y-piece, so that the pressurizing means is connectable to both fluid reservoirs via a respective stop valve. The second valve unit can comprise six terminals so that the first fluid reservoir is connectable to a first stop valve via a first terminal and to a second stop valve via a second terminal and so that the second fluid reservoir is connectable to a third stop valve via a third terminal and to a fourth stop valve via a fourth terminal, and so that the first and fourth stop valves are connectable to the pressurizing means via a terminal and the second and third stop valves are connectable to the surroundings via a terminal. The terminal for connecting the second valve unit to the surroundings can be branched so that two stop valves of the valve unit are connectable to the surroundings via this terminal. The terminal for connecting the second valve unit to the pressurizing means can be branched so that two stop valves of the valve unit are connectable to the pressurizing means via this terminal.

BRIEF DESCRIPTION OF THE DRAWINGS

In the following, embodiments of the present invention will be described making reference to the figures, in which.

DETAILED DESCRIPTION OF THE INVENTION

Figure 1:
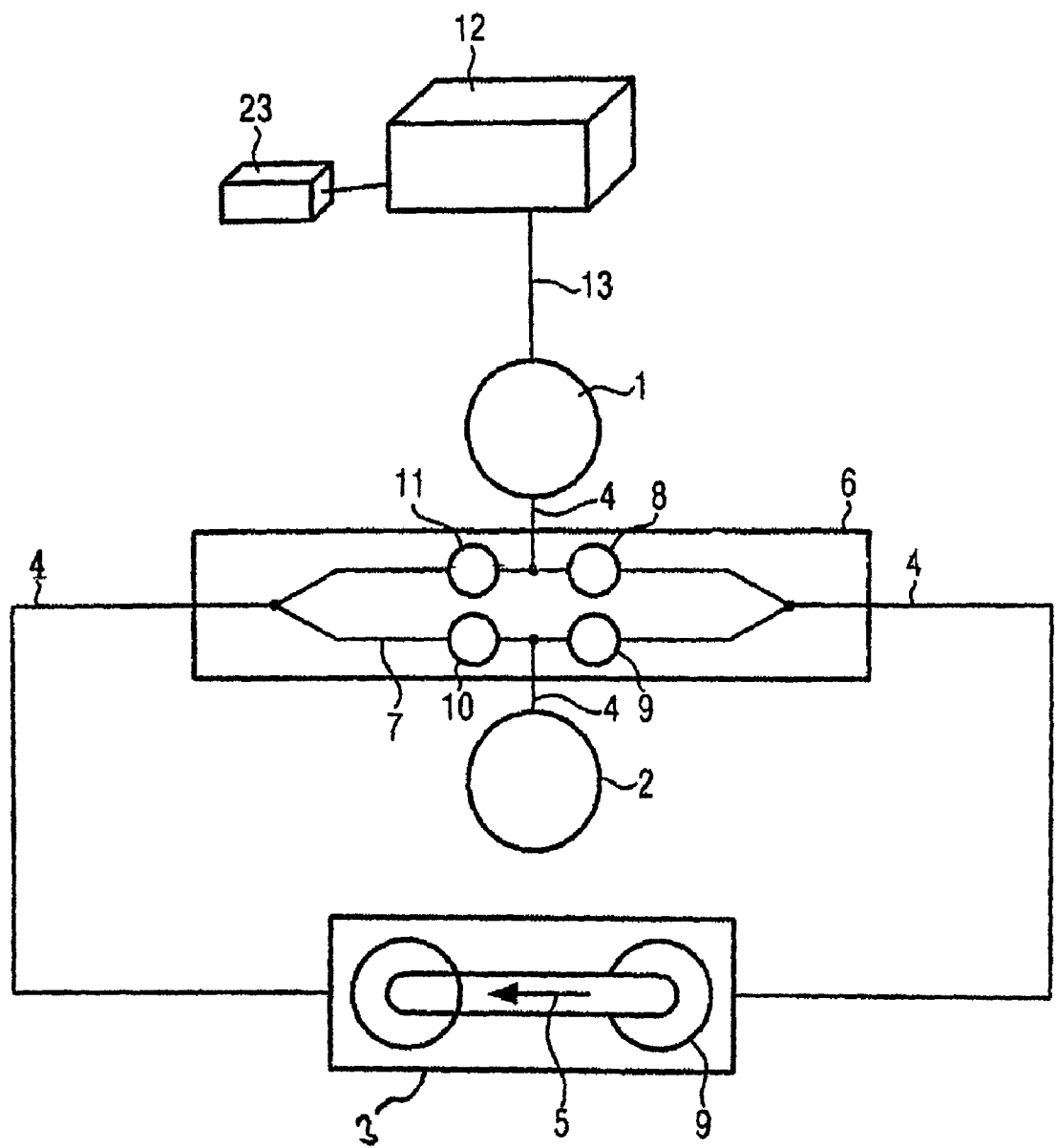
FIG. 1 shows schematically an example of a microfluid system.

The microfluid system shown in FIG. 1 comprises, first and foremost, two fluid reservoirs 1 and 2. In the example following hereinbelow, the fluid will be a liquid; in principle, the fluid can, however, also be gaseous. Each fluid reservoir can, for example, be cylindrical, and may have e.g. the form of a beaker. The microfluid system additionally comprises a flow chamber 3 through which a stream of liquid is to be conveyed in a predetermined direction of flow 5. This serves to examine e.g. adhesion phenomena in the flow chamber.

For producing the stream of liquid, the liquid is conveyed by means of a fluid channel array from the reservoirs 1 and 2 to the flow chamber 3. The fluid channel array comprises the sections 4. Furthermore, a valve unit 6 is provided, with the aid of which the stream of liquid is controlled. The valve unit 6 is implemented such that it guarantees that the stream of liquid will always be conveyed through the flow chamber in the depicted direction of flow 5. In the example shown, the valve unit 6 comprises four valves 8, 9, 10 and 11 as well as a fluid channel array 7. The arrangement of the valves 8 to 11 and of the fluid channel array 7 in the valve unit 6 is chosen such that a bridge rectifier is obtained.

When the microfluid system is in operation, the first fluid reservoir 1 as well as all the fluidic connections between this reservoir and the second fluid reservoir 2, including the flow chamber 3, are first filled with a liquid. Subsequently, the interior of the first liquid reservoir 1 and consequently also the liquid contained therein are pressurized. The valves 8 and 10 are opened, and the valves 9 and 11 are closed. In this way, the liquid will flow from the first liquid reservoir 1 into the second liquid reservoir 2 in the direction of flow 5.

In order to apply the pressure, the conveying means comprises a pressurizing means. This pressurizing means can be implemented in various ways. It may e.g. be a piston pump whose piston is arranged in the first liquid reservoir 1 in such a way that it is in direct contact with the liquid, i.e. wetted by said liquid. With the aid of the piston, the liquid can have applied thereto an overpressure so that it will be forced out of the liquid reservoir. Alternatively, the pressurizing means may also be a syringe pump; in this case, the syringe cylinder can define e.g. the first fluid reservoir.

According to one alternative, a gas-filled, gas-tight hose connection 13 may, as can be seen in FIG. 1, be provided between the pump 12 and the fluid reservoir 1, so that a gas column will be established between the pump 13 and the liquid in the fluid reservoir 1. This gas column can especially be an air column. In this case, the pump 13 can e.g. be an air pump with which the gas in the hose connection 13 is pressurized so that the liquid will be pressurized accordingly. In an analogous manner, the pump may also be implemented as a syringe pump; also in this case, a gas in the syringe will be pressurized.

The use of such a pump, which is separate from the liquid reservoir 1, has the advantage that, on the one hand, a possible contamination of the liquid through contact with the pump components can be avoided. Furthermore, such an arrangement allows the liquid reservoirs 1 and 2, the fluid channel array 7, the valve unit 6 and the flow chamber 3 to be kept under predetermined ambient conditions. These elements can, for example, be kept in an incubator at a temperature of 37° C., 5% $CO_2$ atmosphere and 80% humidity. In particular living cells can advantageously be examined in this way.

The pump 12, however, can be arranged outside of the incubator so as to avoid e.g. an undesired rise of temperature in the incubator due to the waste heat of the pump. The connection between the pump 12 and the fluid reservoir 1 is established through the gas-filled hose 13.

It is also possible to use hydrophobic ferrofluids as a pressurizing means; this will be particularly advantageous in cases where pressurization has to take place in a cavity having a small cross-section. A hydrophobic ferrofluid can e.g. be a perfluorocarbon in which iron, magnetite or cobalt particles are suspended. By applying a magnetic field, a force is applied to the ferrofluid, whereby the latter will be enabled to apply pressure to a liquid which is in direct contact therewith. The magnetic field can be generated e.g. by induction or by moving magnets.

The second fluid reservoir 2 can, for example, be a cylindrical vessel which is open at the top, e.g. a beaker. Alternatively, the second fluid reservoir can be sealed from the surroundings; in the case of a gas-tight sealing, a bleeding device, e.g. a suitable valve, should be provided. If the second liquid reservoir 2 is sealed and provided with a bleeding device, said bleeding device can, in turn, include a sterile filter so as to avoid contamination of the microfluid system.

According to another alternative, a movable piston can be provided, which is in direct contact with liquid conveyed into the second liquid reservoir 2, or which is separated from this liquid by a gas or a gas column. When the liquid is pumped from the first liquid reservoir 1 into the second liquid reservoir 2, the piston in said second liquid reservoir 2 will have pressure applied thereto and move in a direction leading out of said liquid reservoir.

At a certain moment in time, e.g. when the level of liquid in the first liquid reservoir 1 falls below a predetermined level, liquid from the second liquid reservoir 2 is to be conveyed in the same direction of flow 5 through the flow chamber 3 into the first liquid reservoir 1. In order to achieve this, it is e.g. possible to apply a negative pressure to the liquid on the side of the first liquid reservoir so that the liquid from the second liquid reservoir 2 will be sucked into the first liquid reservoir 1.

As soon as the liquid will no longer flow out of, but into the liquid reservoir 1, the valve unit 6 is brought from the first state, in which the valves 8 and 10 were open and the valves 9 and 11 were closed, into a second state, in which the valves 8 and 10 are closed and the valves 9 and 11 are open. In this way, it is accomplished that, in spite of the reverse direction of flow in the first and in the second fluid reservoir, the direction of flow 5 through the flow chamber 3 is maintained. In addition, it can be guaranteed in this way that a continuous flow of liquid is maintained in the flow chamber 3.

Alternatively or additionally to the application of a negative pressure to the first liquid reservoir 1, the liquid in the second liquid reservoir 2 can have applied thereto an overpressure. For this purpose, a pressurizing means can be provided also on the side of the second liquid reservoir 2, said pressurizing means being implemented e.g. analogously to the first pressurizing means. Reference is, however, made to the fact that the pressurizing means provided on the side of the second liquid reservoir may also be of a different nature.

Since especially the liquid reservoirs and the flow chamber are to be kept under predetermined ambient conditions, it will, however, be of advantage when a fluidic connection with a gas column is provided also between the pressurizing means for the second liquid reservoir and said second liquid reservoir, so that the second pressurizing means can be kept separately from the second liquid reservoir. Said first and said second pressurizing means can e.g. be an air pump or a syringe pump in the case of which the piston of the syringe can be moved into two directions so that the interior of the two fluid reservoirs can complementarily have applied thereto an overpressure and a negative pressure, respectively.

The valve unit can be implemented in different ways. In the case of the embodiment illustrated in FIG. 1, which is implemented as a bridge rectifier, the individual valves are preferably stop valves which e.g. allow a flow of liquid in only one direction.

Figure 2:
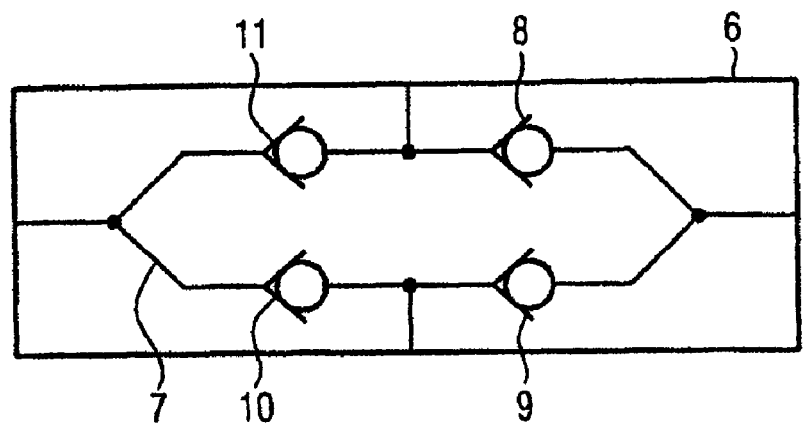
FIG. 2 shows an example of a valve unit for use in such a microfluid system.

An embodiment of such a valve unit is schematically illustrated in FIG. 2. Also in this case, the valve unit comprises four stop valves 8 to 11, which are here implemented as non-return valves. In the embodiment shown, the valves in question are unloaded non-return valves, but spring-loaded non-return valves may be used as well.

It follows that the valve unit 6 comprises four non-return valves and four fluidic terminals for establishing a fluidic connection between the valve unit 6 and the two fluid reservoirs 1 and 2 as well as an inlet opening and a discharge opening of the flow chamber. The non-return valves are arranged such that the flow-through direction is directed towards the inlet opening. In other words, the right fluidic terminal of the valve unit is provided for fluidic connection to the inlet opening of the flow chamber.

Instead of the non-return valves which are self-controlled in the example shown, it is, however, also possible to use externally controlled valves which are actively opened and closed. These valves can e.g. be pinch valves.

In one embodiment, the non-return valve may only comprise a ball which is pressed onto its seat by the fluid pressure; the seat can e.g. be conical in shape. The use of such non-return valves in a valve unit 6 will be of advantage especially in cases where the pumps used are syringe pumps by means of which a constant fluid volume is pumped so that a sufficient pressure difference for closing the respective blocking valves will be achieved. Especially in cases where the pumps used are air pressure pumps, externally controlled valves are preferably used.

The fluid connections 7 between the four fluidic terminals and the valves can be established in a simple form by suitably dimensioned hoses. Attention should be paid to the fact that the valve unit need not be implemented in the form of a rigid arrangement.

According to one alternative, the valve unit shown in FIG. 2 can also be formed in a planar substrate. In this case, said figure would represent a schematic top view of such a substrate. The substrate has then provided therein the fluid channel array 7 as well as the stop valves 8-11.

Figure 3:
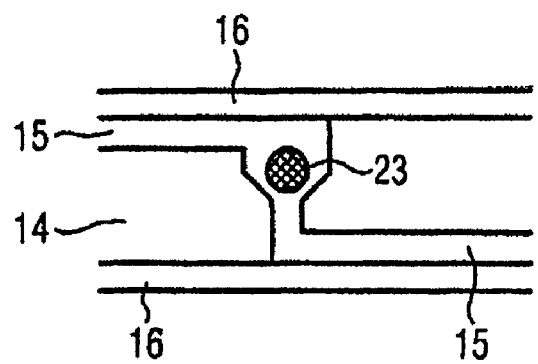
FIG. 3 shows schematically a cross-sectional view of a part of a valve unit in a substrate.

One possibility of forming a stop valve in a substrate is shown in FIG. 3. The substrate comprises a cover plate 14 having recesses 15 and an opening formed therein. The opening is conical in shape so as to define the seat for a non-return valve. Both sides of the cover plate 14 are connected area-wide to a plastic film 16 so that fluid channels are defined. The two plastic films correspond to a base plate and an additional cover plate. The cover plate 30 can be produced as an injection moulded part. The non-return valve additionally comprises a ball 23 which, when the stream of fluid flows in the blocking direction (in the example shown from the left to the right), is pressed onto the conical seat whereby a flow of fluid will be prevented. In the flow-through direction a flow of fluid can take place.

Instead of forming the stop valve in an opening, the fluid channels and the stop valve can also be arranged in one plane. In this case, a fluid channel would first increase in width at the location of the stop valve and then conically taper so as to form the seat of the stop valve.

Instead of a valve unit which is implemented in the form of a bridge rectifier, it is also possible to use directional valves as a valve unit. A valve which will be particularly suitable in this respect is a 4/2-way valve whose two switching states allow the fluid to be conveyed from the first into the second fluid reservoir or from the second into the first fluid reservoir.

Figure 4:
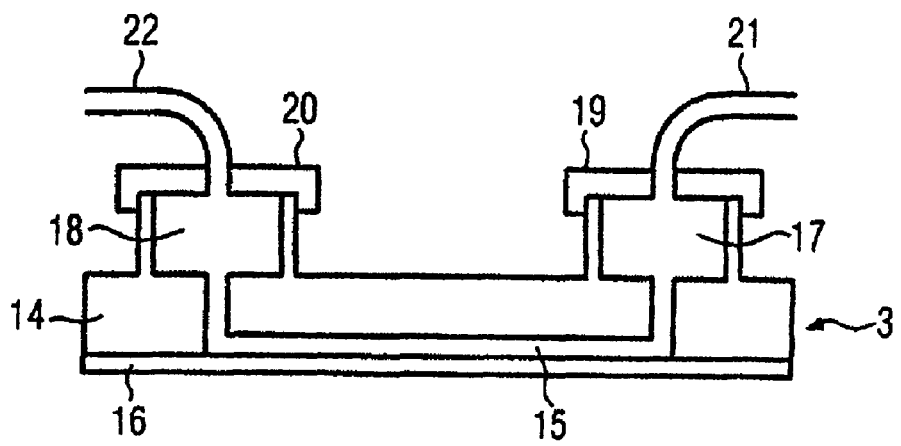
FIG. 4 shows an example of a flow chamber for use in a microfluid system.

An example of a flow chamber for use in a microfluid system of the type described hereinbefore is illustrated in FIG. 4. The flow chamber can be produced especially from a plastic material. The flow chamber 3 comprises a substrate with a cover plate 14 having a trench provided in the lower surface thereof. The cover plate 14 is connected area-wide to a base plate in the form of a plastic film 16 so that a channel 15 is formed. This channel 15 opens into respective liquid reservoirs 17 and 18. These liquid reservoirs are covered by a respective covering element 19 and 20; a hose 21 and 22, respectively, leads into each of said covering elements. With the aid of these hoses a fluidic connection is established, via the valve unit 6, between the flow chamber and the fluid reservoirs 1 and 2.

When the liquid flows from the liquid reservoir 17 to the liquid reservoir 18, the inlet opening of the flow chamber is provided on the side of the liquid reservoir 17 below the discharge opening on the side of the liquid reservoir 18. This allows a conventional flow chamber of the type shown in FIG. 3 to be used in connection with one of the above-described microfluid systems.

Alternatively, it is, however, also possible to provide the flow chamber 3 as well as the liquid reservoirs 1 and 2 and the valve unit 6 as well as the interconnecting fluid channel array on and/or in a common substrate, as illustrated e.g. in FIG. 3 or 4. On one side of a cover plate, trenches can be provided analogously to FIG. 4; when the cover plate has been connected to a plastic film, said trenches form a flow chamber channel, fluidic connection channels 4 as well as possibly necessary connection channels of the valve unit 6. In such a case, fluid reservoirs according to reservoirs 17 and 18 would not be necessary at the mouths of the flow chamber channel. Instead, the fluid reservoirs 1 and 2 could be formed on the substrate in an appropriate manner. Alternatively, the fluid reservoirs 1 and 2 can, however, also be formed by trenches which are implemented in the substrate, in particular in a cover plate, and which are covered by the plastic film.

If the conveying means comprises in such a case e.g. an air pressure pump or a syringe pump, these pumps can be connected to the fluid reservoirs 1 and 2 on or in the substrate e.g. by means of suitable hoses which can be filled with gas, by way of example. Alternatively, the respective pressurizing means can be based on the use of hydrophobic ferrofluids, especially when the fluid reservoirs in question are channel-shaped fluid reservoirs. These hydrophobic ferrofluids would therefore be introduced directly into the respective liquid reservoir channel. Induction coils for generating a suitable magnetic field can be arranged below the substrate or in the substrate. In this case, also the elements of the valve unit can be provided in the substrate.

The control means of the conveying means and/or of the valves can be arranged on or in the liquid reservoirs, the fluid channel array, the valve unit and/or the flow chamber sensors. These sensors can determine e.g. the liquid level or they can detect whether the liquid rises above or falls below a predetermined level. Elements that can be used for this purpose are e.g. capacitors whose electric characteristics change when they come into contact with liquid, or optical sensors which detect a change of light dispersion.

In the case of the microfluid system illustrated in FIG. 1, the pump 12 as well as the valve unit 6 can be controlled by a control means 23. This control means is able to control e.g. closing and opening of the valves as soon as the liquid is pumped in the opposite direction. The control means 23 is also able to control the pump 12, in particular the direction of pumping. This control can be based on output values of sensors provided in the microfluid system.

When overpressure and negative pressure are applied alternately to only one of the two fluid reservoirs, the problem may arise that the target values of the overpressure or of the negative pressure will be reached by the pump unit at different times. This will have the effect that different amounts of liquid are conveyed in the two directions. This will normally lead to a non-uniform distribution of the liquid in the two reservoirs and it may even have the effect that one of the two reservoirs runs dry.

Hence, a second valve unit can be provided, which alternately applies either an overpressure or a negative pressure to both reservoirs with the aid of only one pressurizing or pump means and which opens the respective other reservoir to the ambient air pressure, i.e. establishes the ambient air pressure therein. This additional valve unit comprises four stop valves, each fluid reservoir being adapted to be connected via a stop valve to the pressurizing means and via another stop valve to the surroundings.

By switching the stop valves in a suitable manner (i.e. by opening the stop valve which connects the first reservoir to the pressurizing means and the stop valve which connects the second reservoir to the surroundings, and by closing the two other stop valves), it is now possible to apply a pressure of −40 mbar to e.g. the first reservoir and to connect the second reservoir to the ambient atmosphere. Liquid will now flow from the second reservoir via the first valve unit and the flow chamber into the first reservoir. By switching the second valve unit (blocking the open valves and opening the closed valves), the second reservoir is analogously connected to the pressurizing means, i.e. set to −40 mbar, and the first reservoir is connected to the ambient atmosphere. The liquid from the first reservoir now flows, again via the first valve unit and the flow chamber, into the second reservoir. In view of the fact that the pump which generates the negative pressure is the same in both cases, the respective pressure target value will normally be reached at the same time. The liquid levels in the reservoirs will therefore remain in balance on average.

The respective valves, e.g. pinch valves, for flow control (in the first valve unit) and for air pressure control (in the second valve unit) can be switched in parallel or independently of one another. In the case of parallel switching, the two valve units will always switch simultaneously so that the flow direction of the fluid in the flow chamber will always remain the same.

When the valve units are switched independently of one another, e.g. the air pressure control valves (in the second valve unit) can be switched at longer time intervals, e.g. at 30 second intervals, so that the liquid will respectively flow from the first reservoir via the first valve unit and the flow chamber to the second reservoir for a period of 30 seconds, and, subsequently, from the second reservoir into the first reservoir again for a period of 30 seconds. When, during these time intervals, the first valve unit for liquid control is switched every half second, the direction of fluid flow in the flow chamber will change twice per second; this is also referred to as oscillating flow. This allows a simulation of turbulent flows e.g. in the field of physiological research. Typical switching times for the oscillating flow are 0.25 to 5 seconds.

The above-described microfluid systems may also comprise a plurality of flow chambers, in particular flow chambers which are arranged in parallel and through which a flow of liquid passes. In this respect, each flow chamber may especially have associated therewith separate first and second liquid reservoirs. Especially in cases where an air pressure pump is used, the liquids in all the first liquid reservoirs can be pressurized in parallel by a common air pressure pump.

In this way, one pressurizing means will be able to drive a plurality of fluid circuits. For example, an air pressure unit can be used for conveying liquid between four reservoir pairs. In this case, a first flow control valve unit can be used for each of the reservoir pairs, said first valve unit being switched either independently of or parallel to the first valve units of the respective other reservoir pairs and/or the second valve unit of the air pressure control means. The first valve units of two of the reservoir pairs can, for example, be synchronized with the second valve unit for air pressure control and can switch e.g. once every minute, whereas the first valve units of the other two pairs switch at 0.5 and 1 second intervals. This would lead to a unidirectional flow in the first two flow chambers and to an oscillating flow at 0.5 and 1 second intervals in the other two flow chambers.

The invention claimed is:

1. A microfluid system comprising:
   first and second fluid reservoirs,
   a flow chamber,
   a fluid channel array which is arranged such that the first fluid reservoir is in fluidic communication with the second fluid reservoir via the flow chamber,
   a conveying means for conveying a fluid from said first fluid reservoir via the flow chamber into said second fluid reservoir, and
   a valve unit,
   wherein the valve unit can be brought from a first state to a second state so that, in said first state, a fluid can be conveyed by the conveying means from said first fluid reservoir through the flow chamber in a predetermined direction of flow into the second fluid reservoir, and so that, in said second state, a fluid can be conveyed by the conveying means from said second fluid reservoir through the flow chamber in the predetermined direction of flow into the first fluid reservoir,
   wherein the valve unit comprises four stop valves and four terminals for establishing a fluidic connection among the first fluid reservoir, the second fluid reservoir, an inlet opening of the flow chamber in the direction of flow, and a discharge opening of the flow chamber in the direction of flow, wherein the valve unit is implemented such that a fluidic connection can be established between each fluid reservoir and the inlet opening as well as the discharge opening, wherein along each of these connections one of the stop valves is arranged,
   wherein the conveying means comprises a pressurizing means to apply a positive or negative pressure to the first fluid reservoir, the first fluid reservoir being arranged along a fluidic path between the pressuring means and the valve unit.

2. A microfluid system according to claim 1, wherein the four stop valves are arranged after the fashion of a bridge rectifier.

3. A microfluid system according to claim 1, wherein at least one of the stop valves is an externally controlled stop valve.

4. A microfluid system according to claim 1, wherein at least one of the stop valves is a non-return valve.

5. A microfluid system according to claim 1, wherein the valve unit is implemented in a substrate.

6. A microfluid system according to claim 1, wherein the first pressurizing means is one of an air pressure pump, a piston pump, a diaphragm pump, a peristaltic pump, a syringe, and a syringe pump.

7. A microfluid system according to claim 1, wherein the fluid is a liquid and the conveying means comprises a hydrophobic ferrofluid which is arranged in said first fluid reservoir in such a way that the liquid can be pressurized via the ferrofluid by means of a magnetic field.

8. A microfluid system according to claim 1, wherein the conveying means comprises a bleeding device which is arranged on the second fluid reservoir.

9. A microfluid system according to claim 1, wherein the conveying means comprises a piston which is arranged such that the interior of the first fluid reservoir can pressurized.

10. A microfluid system according to claim 1, wherein the conveying means comprises a piston which is arranged such that it is adapted to be moved by a fluid conveyed into the second fluid reservoir.

11. A microfluid system according to claim 1, wherein at least a part of said first and/or second fluid reservoir(s) is formed by a syringe cylinder.

12. A microfluid system according to claim 1, wherein the fluid is a liquid and the conveying means is implemented such that a fluidic connection is established between the fluid and at least one pressurizing means, a gas being provided in at least part of said fluidic connection.

13. A microfluid system according to claim 1, wherein the pressurizing means is a first pressurizing means, and wherein the conveying means further comprises a second pressurizing means so as pressurize the interior of the second fluid reservoir, wherein the second pressurizing means is an air pressure pump, a piston pump, a diaphragm pump, a peristaltic pump, a syringe or a syringe pump.

14. A microfluid system according to claim 13, wherein the conveying means is implemented such that the interior of the second fluid reservoir is adapted to have applied thereto a negative pressure, whereas the first pressurizing means applies an overpressure to the interior of the first fluid reservoir.

15. A microfluid system according to claim 1, further comprising a sensor unit for determining a flow of fluid, a fluid level and/or a fluid pressure in said microfluid system.

16. A microfluid system according to claim 1, further comprising a control means for controlling the valve unit, the conveying means and/or the sensor unit.

17. A microfluid system according to claim 16, wherein the control means is implemented such that the fluid can flow continuously through the flow chamber.

18. A microfluid system according to claim 16, wherein the valve unit comprises four externally controlled stop valves and the control means used for controlling the valve unit is implemented such that two respective stop valves are closed and two respective stop valves are opened simultaneously.

19. A microfluid system according to claim 1, wherein the valve unit is a first valve unit, further comprising:
a second valve unit that includes four stop valves and four terminals for establishing a fluidic connection among the first fluid reservoir, the second fluid reservoir, the pressurizing means and the surroundings, wherein the second valve unit is implemented such that each fluid reservoir is adapted to be connected to the pressurizing means via a stop valve and to the surroundings via another stop valve.

20. A microfluid system according to claim 17, wherein the valve unit comprises four externally controlled stop valves and the control means used for controlling the valve unit is implemented such that two respective stop valves are closed and two respective stop valves are opened simultaneously.

* * * * *